US008669513B2

(12) United States Patent
Hughes et al.

(10) Patent No.: US 8,669,513 B2
(45) Date of Patent: Mar. 11, 2014

(54) METHOD OF ASSEMBLING A LIGHT SENSOR MODULE USING AN INTERMEDIATE LAYER, AND LIGHT SENSOR MODULE ASSEMBLY INCLUDING THE SAME

(75) Inventors: Patrick J. Hughes, Cork (IE); John C. Jackson, Cork (IE)

(73) Assignee: SensL Technologies Limited, Cork (IE)

( * ) Notice: Subject to any disclaimer, the term of this patent is extended or adjusted under 35 U.S.C. 154(b) by 842 days.

(21) Appl. No.: 12/447,722

(22) PCT Filed: Oct. 29, 2007

(86) PCT No.: PCT/EP2007/061619
§ 371 (c)(1),
(2), (4) Date: Jun. 24, 2009

(87) PCT Pub. No.: WO2008/052965
PCT Pub. Date: May 8, 2008

(65) Prior Publication Data
US 2010/0065724 A1    Mar. 18, 2010

(30) Foreign Application Priority Data

Oct. 30, 2006  (GB) .................................. 0621495.1

(51) Int. Cl.
*H01J 3/14*       (2006.01)
*G01T 1/20*       (2006.01)
(52) U.S. Cl.
USPC ..................................... 250/216; 250/370.11
(58) Field of Classification Search
USPC ........................................... 250/216, 370.11
See application file for complete search history.

(56) References Cited

U.S. PATENT DOCUMENTS 4,940,901 A * 7/1990 Henry et al. ............. 250/370.09
5,936,230 A * 8/1999 Street ...................... 250/214 VT (Continued)

FOREIGN PATENT DOCUMENTS

| EP | 0 305 112 | 8/1988 |
| EP | 1 365 261 | 11/2003 |
| SE | 467 377 | 7/1992 |

OTHER PUBLICATIONS

International Search Report for corresponding Application No. PCT/EP2007/061619 mailed Mar. 17, 2008.

(Continued)

*Primary Examiner* — Thanh Luu
(74) *Attorney, Agent, or Firm* — Renner, Otto, Boisselle & Sklar, LLP (57) ABSTRACT

A method is provided of at least partly assembling a light sensor module having at least one light sensing element optically coupled to a further optical element, for receiving light therefrom. The method comprises coupling the at least one light sensing element to an intermediate layer, wherein the intermediate layer is adapted to provide at least a predetermined level of optical coupling between the optical element and the at least one light sensing element when assembled by subsequently coupling, for example as part of a separate method, the intermediate layer to the optical element, with the intermediate layer being arranged between the optical element and the at least one light sensing element. An optical element other than a light sensing element, for example a light source element, can be used in place of the or each light sensing element, with in that case the or each optical element providing light to the further optical element rather than receiving light therefrom. Thus, the method can relate to an optical assembly in general rather than to a light sensor module assembly in particular.

46 Claims, 5 Drawing Sheets

Diagram: Not to scale

(56) References Cited

U.S. PATENT DOCUMENTS

| | | | |
|---|---|---|---|
| 6,452,186 B1* | 9/2002 | Wieczorek et al. | 250/370.11 |
| 6,649,914 B1 | 11/2003 | Moorman et al. | |
| 6,759,687 B1* | 7/2004 | Miller et al. | 257/98 |
| 6,874,952 B2* | 4/2005 | Nishimura | 385/89 |
| 2001/0030276 A1* | 10/2001 | Hoshino | 250/208.1 |
| 2002/0079459 A1* | 6/2002 | Dorscheid et al. | 250/370.11 |
| 2003/0122083 A1 | 7/2003 | Possin et al. | |
| 2003/0187349 A1* | 10/2003 | Kaneko et al. | 600/425 |
| 2004/0041221 A1* | 3/2004 | Boon et al. | 257/433 |
| 2004/0175189 A1 | 9/2004 | Weber-Rabsilber et al. | |
| 2004/0252951 A1* | 12/2004 | Nagasaka et al. | 385/88 |
| 2005/0248680 A1* | 11/2005 | Humpston | 348/340 |
| 2005/0285044 A1* | 12/2005 | Mollov | 250/370.11 |

OTHER PUBLICATIONS

British Search Report for corresponding Application No. 0621495.1 dated Mar. 1, 2007.

\* cited by examiner

G = 100-200μm spacing between SPM detectors
H = 50μm gap maximum allowed between SPM detectors Air Gap filled with appropriate index matching material – gels/rubbers.

*Diagram: Not to scale*

FIG. 7

4 bonding sites for flip-chip of each detector onto Flex

G =100-200μm track lane between adjacent SPM detectors

METHOD OF ASSEMBLING A LIGHT SENSOR MODULE USING AN INTERMEDIATE LAYER, AND LIGHT SENSOR MODULE ASSEMBLY INCLUDING THE SAME

TECHNICAL FIELD

The present invention relates to a method of assembling a light module and a light module when so assembled.

DISCUSSION OF RELATED ART

Avalanche Photodiode (APD) sensors are commonly used to detect extremely small amounts of light across the whole spectrum including UV, visible or IR radiation. Typically, a photodiode is biased in avalanche mode, which results in a single incident photon of light producing a large number of electron hole pairs, i.e. a large current. This results in a low-light signal producing an amplified and readable electrical signal proportional to the input light signal, i.e. an analogue electrical output. Typical amplification or gain for normal APDs is measured in the tens to hundreds.

This is to be contrasted with Geiger-mode operation of photodiodes. In Geiger mode, the diode junction is reverse-biased above the breakdown voltage for the diode. An incident light photon will cause an uncontrolled avalanche of electron-hole pairs, and hence a large spike of current. A quench circuit detects the surge in current caused by this breakdown and reduces the reverse bias voltage across the junction, which in turn stops the breakdown, and thereby stops the current. The effect is a pulse of current for each photon. Typical amplification or gain values for photodiodes operating in Geiger mode is $>10^5$.

A Silicon Photomultiplier (SiPM) is a relatively new sensor concept, and is described in: (a) Z. Y. Sadygov et al., "Avalanche Semiconductor Radiaton Detectors", Trans. Nucl. Sci. Vol. 43, No. 3 (1996) 1009; and (b) V. Saveliev, "The Recent Development and Study of Silicon Photomultiplier", Nucl. Instr. Meth. A 535 (2004) 528-532.

A SiPM uses an array of photodiodes operating in Geiger mode and sums the electrical output of all the diodes. The net result is a series of pulses (from the diodes that have detected a photon) being added together. As individual diodes detect photons the summed output will increase or decrease. This produces an analogue electrical output which is proportional to the number of photons incident on the total sensor. The gain in this case is still $>10^5$.

There are three different categories of existing technology that produce an amplified analogue electrical output signal that is proportional to the optical signal, as set out below.

(a) Photomultiplier Tubes (PMTs). These are the traditional solution for applications requiring large area and large gain sensors. They are based on similar technology to that used in early glass tube transistors in the 1950s, and rely on a photocathode to convert a photon into a photoelectron and a separate dynode chain under high bias to produce amplification of the photoelectron. Their disadvantages include that they are bulky, cannot be miniaturised, generally have a slow timing response (except for high-end, and expensive, micro-channel plate detector type PMTs, which can exhibit picosecond timing resolution), require high bias operation (typically from 500 V to 2000 V), can be damaged when exposed to ambient light, have low Quantum Efficiency, and importantly for many applications have high sensitivity to magnetic environments. They are, however, large area (typically 1 to 2 inches) and provide a high gain to the collected photoelectrons (typically of the order of $10^6$).

(b) Normal APDs. The basic operation of these devices has been briefly explained above. This type of device has been the only solid-state APD solution until recently, and has been applied in many applications. However, as mentioned above, the gain is low (typically 10 to 200), and it is difficult to achieve a stable high value of gain. It is also difficult to produce large area devices that do not have large dark current.

(c) SiPMs—Silicon Photomultipliers. These devices are mentioned briefly above. In particular, their gain is very high, and the size of the sensor can also be made relatively large, for example up to 4 mm$^2$. For applications above this size, there are a number of technical issues. It is important to have uniformity on the breakdown voltage across the large number of diodes/pixels in a SiPM, and the wafer processing control required to achieve this can become difficult for larger sensors.

Applications for photo-detection systems include spectrophotometric systems, nuclear medical systems, biomedical systems, microarray scanners, biodiagnostics systems, and high energy physics. Each of these applications requires that a detector or detector arrays be closely coupled with scintillators or other light sources, in addition to the integration of electrical contact to the detectors and connections to external electronics. The detection systems for these applications require high gain, large area optical detectors, and accordingly the current optical detector market is dominated by Photomultiplier Tubes (PMTs).

Typically, the large sensitive area of the PMT detector makes it ideal for many applications where there is a large area that needs to be imaged or that photons are coming from a large diffuse source. In these cases, it is difficult to use small area detectors as there are large losses in the optical systems that are required to couple photons onto the detector. For these large detection applications, a large area detector is required. Many of these applications also require the use of scintillators to convert high energy photons into lower energy photons suitable for detection with commonly-used detectors. Ideally, detection of high energy particles could be performed directly by the detector itself, but the energy of the photons under detection are often of the order of keV which are difficult to detect with present state-of-the-art detectors. For these applications, a scintillator is required for photon conversion and it must be directly coupled onto the detector to minimise photon loss. Several applications that require large area detectors are described below by way of example.

In nuclear medicine, radiological imaging techniques are widely employed to study body functions (human and small animal) such as blood flow, metabolic processes and anatomical features. To carry out a nuclear scan, small tracer amounts of radioisotopes are administered to patients and sophisticated imaging systems perform cross section and 3D images. Current imaging techniques include: Single photon emission computed tomography (SPECT); Positron Emission Tomography (PET for humans & animals); and MRI (magnetic resonance imaging).

Recent years have seen the introduction of multi-modality imaging. The primary benefit of the use of two simultaneous scans is the acquisition of two data sets that can be exactly superimposed, spatially, and to some extent, temporally. This is most beneficial when the two data sets yield different and complimentary information, such as the functional (e.g. metabolic) information from PET with the higher resolution anatomical detail given by CT (Computed Tomography). CT data can also be used for the attenuation correction of PET data and now combined PET/CT systems are available commercially. (For example see T Beyer et al Journal of Nuclear Medicine, Vol 41, Issue 8 1369-1379, 2000; "A combined PET/CT scanner for clinical oncology".)

Similarly, the possibility of simultaneous PET and MRI is currently being pursued. Although this is substantially less straightforward than the integration of PET/CT, the gains are deemed to be worth the effort. Small prototypes have been built and used as demonstrators, but no full system currently exists. A full system based on PMTs (like the demonstrator) is unlikely to be commercially viable due to magnetics incompatibility.

Another desirable feature for future PET systems is that of time-of-flight (ToF). This is based upon having a very good timing-resolution detection system, such that the arrival times of the two 511 keV photons are recorded with sufficient accuracy to enable one to narrow down the range of possible origin points of the photons. ToF is unlikely to be good enough to directly improve the spatial resolution of the system, but by eliminating sources of noise from outside the area of interest, one can reconstruct a better quality image. Therefore, a detector with very fast timing, would enable the development of such systems.

In addition, PET detector modules comprise PMTs coupled to respective scintillators. Scintillators are materials that emit visible or near visible light when energy is absorbed from ionising radiation such as gamma rays. Typically, scintillator materials include LSO, LYSO, $BaF_2$ and BGO crystals and have been used to count and image radioisotopes when coupled to PMTs.

In PET detector modules, the decay of the radioisotope produces 2 antiparallel gamma rays, each at 511 keV. The most efficient way of imaging is to enclose the patient with a ring of scintillator detectors with each detector in electronic coincidence with those on the opposite side of the patient. When a pair of photon detectors simultaneously detect 511 key energy an annihilation event has occurred. Multiple detector rings are stacked on top of one another to obtain a 3D image.

Figure 1:
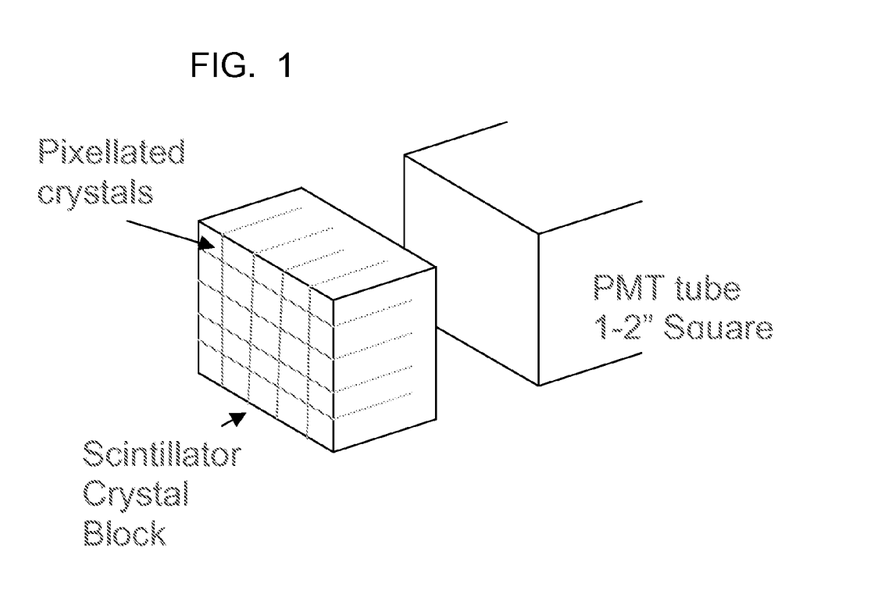
FIG. 1, described hereinbefore, shows a previously-considered Scintillator-to-PMT PET detection system.

The detector module consists of a block detector. Typically, the scintillator detector consists of a block of scintillator which is partially cut to create a N×N array of quasi-independent crystals (pixellated crystals) that are grouped together and coupled to PMTs. FIG. 1 of the accompanying drawings shows a conventional Scintillator-to-PMT PET detection system. A PMT used in these applications is typically of the order of 1" to 1.5" in diameter (or 1"×1" to 1.5"×1.5").

PMTs are widely used my many high energy physics experiments, forming the basis of a large amount of the instrumentation. Many of the detectors for the high energy particles produced in these experiments are composite detectors, being formed of a scintillator and photodetector. The scintillator acts as a converter medium, absorbing the high energy particles and photons and emitting lower energy, visible photons. This light is then measured by the photodetector. Depending of the chosen configuration of these two elements, position, energy and timing information can be obtained. Typically these experiments require large detectors, surrounding the 'vertex point' where the two particle beams collide. Sometimes, the area of photodetector required to readout a given scintillator volume is reduced by using fibres that guild the light onto a PMT.

The compatibility of PMT with MRI systems is impractical and requires the development of an alternative magnetic insensitive detectors technology for multi-modal systems. One promising alternative for PET systems is the Silicon Photomultiplier (SiPM) mentioned above; for example, see N Otte et al "The SiPM A new Photon Detector for PET", Nuclear Physics B (Proc. Suppl.) 150 (2006) 417-420. SiPM detectors are attractive to PET systems because they allow one-to one coupling to small crystals allowing for better overall spatial resolution. In addition, the transit time spread of SiPM detectors is small (e.g. 100 ps) which is important for PET scanners which use time of flight (TOF) information as the coincidence time resolution of the system enables enable reduction is statistical noise in image reconstructions.

In addition, for good spatial resolution in PET modules, it is important to be able to measure the identity of the pixellated crystal but also the depth of interaction within that crystal. Several approaches to measuring interaction depth are possible. These include: (a) stratified layers of different scintillator with different decay times; (b) light sharing approach where each scintillator element is attached to two detectors at opposing ends of the crystal; and (c) stacking of image planes of scintillator and detectors.

To improve the design of calorimeters in HEP (High Energy Physics) applications, greater integration of the different detection systems are needed. SiPM technology is a promising candidate to integrate directly large area arrays of detectors directly to scintillators in magnetic environments typically in the region of 2-5 T, see for example V D Kovaltchouk, G J Lolos, Z Papandreou and K Wolbaum "Comparison of a silicon photomultiplier to a traditional vacuum photomultiplier", Nuclear Instruments and Methods in Physics Research Section A: Accelerators, Spectrometers, Detectors and Associated Equipment, Volume 538, Issues 1-3, 11 Feb. 2005, Pages 408-415.

The above two examples highlights the current constraints with PMT when magnetic environments are used. The current solutions to overcome the practical issues with PMT include shielding, remote housing of PMTs from source and coupling via optical fibers are not adequate and hence SiPM technology is attractive.

As mentioned previously, the Silicon Photomultiplier (SiPM) is an extension of the concept of the Geiger-mode avalanche photodiodes (APD) to give an output signal proportional to the input photon flux, by using a parallel array of such devices with multiplexed output. In this way, the total device behaves like an 'analogue' device for photon fluxes, where the number of pixels activated, and hence the size of the output current, is directly proportional to the number of incident photons.

The SiPM detector has performance characteristics comparable to PMT devices and overcomes many of their operational limitations including robustness, magnetic sensitivity, ambient light sensitivity and high bias voltage requirement. In addition, the main benefits include:

compact, small form factor sensors and front end electronics compared to PM tubes,
immune to fluctuating magnetic fields, no high-voltage supply and low power consumption,
high quantum efficiency and timing response,
low excess noise.

SiPM detectors are currently limited to detector sizes of the order to several millimeters square. To compete with PMT, large area detection comparable to the typical PMT area of ~1" sizes is required. At present, large area single chip monolithic solutions are not available with SiPM technology.

It is desirable to address the scaling of individual small PM detectors to tile across a large area to develop large area detection. This is taught to some extent in our co-pending PCT/GB2006/050123, but particular issues need to be addressed when considering a one-to-one coupling between the SiPM detectors and further optical elements like scintillators or optical source blocks, for example in applications including but not limited to those described above.

Radiation detectors mounted on a substrate are disclosed in A Jaksic, K Rodgers, C Gallagher, and P J Hughes, "Use of RADFETs for Quality Assurance of Radiation Cancer Treatments", PROC. 25th International Conference On Microelectronics (Miel 2006), Vol 2, Belgrade, Serbia And Montenegro, May, 2006.

SUMMARY

According to a first aspect of the present invention there is provided a method of assembling a light sensor module having at least one light sensing element optically coupled to a further optical element, for receiving light therefrom, the method comprising: a first step of coupling the at least one light sensing element to an intermediate layer; and a second step, following after the first step, of coupling the intermediate layer to the optical element, such that the intermediate layer is arranged between the optical element and the at least one light sensing element; wherein the intermediate layer is adapted to provide at least a predetermined level of optical coupling between the optical element and the at least one light sensing element.

The or each of the at least one light sensing element may have a respective light input surface arranged to face the intermediate layer.

The intermediate layer may be so adapted by being thin.

The intermediate layer may have a thickness of less than 500 μm.

The intermediate layer may have a thickness of less than 100 μm.

The intermediate layer may have a thickness of less than 25 μm.

The intermediate layer may be so adapted by being sufficiently optically transparent to provide the predetermined level of optical coupling.

The intermediate layer may be so adapted by comprising at least one aperture formed therein, and the first step may comprise arranging the or each of the at least one sensing element over a corresponding respective aperture.

Sidewalls of the at least one aperture may be angled and/or metallised to improve the optical coupling.

The method may comprise filling the at least one aperture with a material having a refractive index selected to improve the optical coupling.

The intermediate layer may be provided with at least one alignment feature to enable alignment of the at least one sensing element on the intermediate layer.

The at least one alignment feature may comprise the at least one aperture.

The optical element may be at least partly segmented into at least one region, and the or each of the at least one aperture may be arranged to align with a corresponding respective region of the optical element when assembled, thereby achieving alignment between the at least one region and the at least one sensing element when assembled.

The intermediate layer may comprise one or more embedded optical layers, such as waveguides and optical elements such as gratings or mirrors, to couple, transport and/or redirect light between different light sensing elements.

The intermediate layer may comprise a substantially planar film.

The intermediate layer may comprise a polymer material.

The intermediate layer may be flexible.

The intermediate layer may be at least partly stiffened, for example around the periphery of circuitry, to provide specific areas of rigidity where needed.

The optical element may comprise a curved surface, and the method may comprise coupling the intermediate layer to the optical element over at least part of the curved surface, the flexibility of the intermediate layer allowing it to conform to the curved surface.

The method may comprise altering the shape of the curved surface after coupling the intermediate layer to the optical element, with the intermediate layer retaining its conformance to the curved surface.

The intermediate layer may be substantially rigid.

The intermediate layer may be formed of material such as PCB, Silicon, glass, polyimide or dielectric film.

Metal tracking may be formed over the intermediate layer, and the first step may comprise electrically coupling the at least one sensing element to the metal tracking.

Metal tracking may be formed by one or more levels of metal, on one or both sides of the intermediate layer.

The metal tracking may form a printed circuit on the intermediate layer.

The metal tracking may be arranged to allow each of the plurality of sensing elements to be addressed individually.

The metal tracking may be arranged to allow each of the plurality of sensing elements to be addressed collectively.

Additional circuitry and/or electrical components may be provided on the intermediate layer.

The intermediate layer may be provided with single or multiple bondpad sites.

The intermediate layer may be provided with a patterned light reflective surface arranged to face the optical element to reflect light back towards the optical element that does not fall on a respective active area of the at least one light sensing element.

The intermediate layer may be adapted to enable the coupling and/or attachment of fibres, waveguides, lights cones and the like, so as to be accurately aligned and connected to the at least one light sensing element.

The intermediate layer may comprise at least one perforated structure with a pedestal and/or stand-off to enable direct integration of a coupling element such as a fibre.

The intermediate layer may comprise at least one adhesive site or appropriate mounting feature to enable alignment and/or locking of the at least one sensing element on the intermediate layer.

A plurality of sensing elements may be arranged on the intermediate layer in a tiled or array configuration.

The or each element may comprise Silicon Photomultiplier circuitry.

The optical element may be selected from: fibre optics, scintillators, photonic crystals, quantum dots, lasers, holy fibres, and waveguides.

The second step may not carried out as part of a method according to the invention, only subsequently.

The predetermined level of optical coupling may be at least 75%. The predetermined level of optical coupling may be at least 85%. However, the coupling efficiency need not be high. It can be determined according to the requirements of the intended application. Indeed, the coupling efficiency could be rather low, so long as the sensitivity is high enough to allow the signal to be detected. For example, there are cases where the coupling efficiency might intentionally be lowered if the optical source is emitting too much light and saturating the detector.

The intermediate layer may be adapted to include electronic circuitry.

The intermediate layer may comprise an adhesive layer for mechanically attaching the or each light sensing element mounted on the intermediate layer to the further optical element.

According to a second aspect of the present invention there is provided a method of at least partly assembling a light sensor module having at least one light sensing element optically coupled to a further optical element, for receiving light therefrom, the method comprising: coupling the at least one light sensing element to an intermediate layer, wherein the intermediate layer is adapted to provide at least a predetermined level of optical coupling between the optical element and the at least one light sensing element when assembled by subsequently coupling, as part of a separate method, the intermediate layer to the optical element, with the intermediate layer being arranged between the optical element and the at least one light sensing element.

According to a third aspect of the present invention there is provided a light sensor module assembly comprising at least one light sensing element optically coupled to a further optical element, for receiving light therefrom, wherein the at least one light sensing element is coupled to an intermediate layer, and the intermediate layer is coupled to the optical element, such that the intermediate layer is arranged between the optical element and the at least one light sensing element, and wherein the intermediate layer is adapted to provide at least a predetermined level of optical coupling between the optical element and the at least one light sensing element.

The optical element may comprise a curved surface, and the intermediate layer may be coupled to the optical element over at least part of the curved surface, the intermediate layer being flexible so as to allow it to conform to the curved surface.

According to a fourth aspect of the present invention there is provided a light sensor module assembly comprising at least one light sensing element coupled to an intermediate layer, wherein the intermediate layer is adapted to provide at least a predetermined level of optical coupling between the at least one light sensing element and a further optical element when the intermediate layer is subsequently coupled to the further optical element, with the intermediate layer arranged between the optical element and the at least one light sensing element, the at least one sensing element receiving light in use from the further optical element.

In method or module according to the present invention and preferred embodiments thereof as set out above, an optical element other than a light sensing element may be used in place of the or each light sensing element. For example a light source element could be used instead of a light sensing element. Of course, the direction of light transferral between the or each optical element and the further optical element would have to be construed and varied accordingly, so that for example in the case of using light source elements as the optical elements, the or each optical element would be optically coupled to the further optical element for providing light to, not for receiving light from, the further optical element. A method or module embodying the present invention can thereby relate to an optical assembly in general rather than to a light sensor module assembly in particular.

Advanced electronic interconnect packaging methods are needed for applications which require individual or 2D arrayed elements (i.e. sources or sensors) for large area emission/detection. Applications include RFID's, smart card biometrics, flex displays, large area OLED (Optical Light Emitting Diodes) lighting and medical sensor array imaging.

These applications require the development of smart electronic interconnect solutions which support high fidelity low cost, light weight connections to each element within an array such that all elements are either individually or collectively addressed.

Various deficiencies of the prior art are addressed by a packaging embodiment of the present invention wherein a mechanical assembly method to package elements in an N×M array format is disclosed. An embodiment of the present invention will be primarily described within the context of the integration and coupling of photodetector elements to scintillator sources. However, it will be appreciated by those skilled in the art informed by the teachings herein that an embodiment of the present invention is also applicable to any element such as a source where scaling in array format is desired.

The module may be operable in a mode of operation in which the elements cooperate in use to produce a combined output signal indicative of an overall level of light falling on the elements.

Each element may be arranged to make electrical connection to the intermediate layer through the surface of the element that is arranged to faced towards the intermediate layer. This leaves the sides of the element substantially free, thereby enabling adjacent elements to sit closely together to form a close-tiled arrangement of the elements covering a large area.

Each element may comprise solid-state light sensing circuitry.

Each element may comprise a silicon die.

Each element may comprise low-voltage circuitry.

Each element may be adapted to produce an amplified electrical output signal which is substantially proportional to the optical input signal.

The output signal may be an analogue output signal.

Each element may comprise high-gain light sensing circuitry.

The gain may be greater than $10^3$.

The gain may be greater than $10^5$.

Each element may comprise Silicon Photomultiplier circuitry, Avalanche Photodiode, PIN Photodiode.

Each element may have a substantially rectangular footprint.

Adjacent elements may be arranged to abut each other.

The active area of each element may extend substantially to the edges of the element.

Each element may comprise shallow junction circuitry having electrical contacts on the opposed surface.

Each element may be prepared using a back thinning technique on a light input surface.

Each element may be bonded to the intermediate layer.

The module may comprise additional circuitry for providing additional functionality.

The additional circuitry may comprise processing circuitry for processing signals received from the elements.

The additional circuitry may comprise control circuitry for sending signals to the elements.

The additional circuitry may comprise interface circuitry for interfacing with external apparatus.

The additional circuitry may comprise capacitance decoupling circuitry.

Where the intermediate layer has a light input surface facing the elements and an opposed surface facing away from the elements, the additional circuitry may be mounted on the opposed surface of the intermediate layer.

The additional circuitry may be low-voltage circuitry.

The SiPM may form an overall active area greater than 1 millimeter square in area The SiPM may form an overall active area greater than 5 millimeter square in area The SiPM may form an overall active area greater than 10 millimeter square in area The tiled arrangement may form an overall active area greater than 1 square cm in area.

The tiled arrangement may form an overall active area greater than 5 square cm in area.

The tiled arrangement may form an overall active area greater than 10 square cm in area.

Each element may comprise a light input surface arranged to face towards the intermediate layer and an opposed surface arranged to face away from the intermediate layer, and may be arranged to make electrical connection to the intermediate layer through the light input surface.

The module may be operable in a mode of operation in which different groups of elements are selectable to produce different output signals for those respective groups, whether at the same time or at different respective times or a combination thereof, where each group comprises one or more elements.

The module may be operable in a mode of operation in which each group comprises a single element, so that separate output signals are produced for the respective elements.

The module may comprise output circuitry operable to allow the output signals to be read out individually or multiplexed and read out sequentially as appropriate.

The module may comprise amplification circuitry to amplify one or more output signals before they are passed outside the module.

The module may comprise a connector for connecting to control circuitry arranged on a separate substrate. Light sensor apparatus may be provided comprising such a light sensor module and the separate substrate on which the control circuitry is arranged.

A method may be provided to optically couple a light source, light sources or coupling element(s) to at least one detector element or "tile" consisting of an array of detector elements.

An assembly may be provided comprising an intermediate layer positioned between the source and detector elements.

An assembly may be provided comprising an intermediate layer providing direct or indirect optical coupling and mounting means to secure and align an optical source or coupling element to detector element.

An assembly may be provided comprising an intermediate layer consisting of electrical interconnection to address collectively or individually the detector elements.

The intermediate layer may be a substantially planar film.

The intermediate layer may form a printed circuit.

The intermediate layer may be rigid or flexible or both.

The intermediate layer may comprise a polymer or suitable material such as silicon, glass, or dielectric film.

The intermediate layer may have sufficient optical transparency for source emissions and detector responsivity.

The intermediate layer may not be optically transparent but may be perforated with machined apertures of varying shapes and sizes.

The sidewalls of the machined apertures may be angled and metallised to improve the collection of light onto the detector.

The perforated openings in the layer may be filled with appropriate index match material or cookies to optimise coupling and reduce refractive index difference between the detector and source.

The intermediate layer may be unperforated, but may instead have embedded optical layers such as waveguides and optical elements such as gratings or mirrors to couple, transport and or redirect the light signal between different elements.

The intermediate layer may range in thickness from thin membranes to thick layers.

The intermediate layer may have fine metal traces with single or multiple metal levels.

The intermediate layer may contain single or multiple bondpad sites.

The intermediate layer may comprise a single metal layer with single or multiple metal traces.

The intermediate layer may comprise a double metal layer flex with single or multiple traces on both sides of the flex.

The intermediate layer may comprise of a multiple metal layer flex with single or multiple traces.

The intermediate layer may comprise light sensing circuitry and components.

The intermediate layer may comprise metal traces on the intermediate layer facing the source which back reflect light not impinging on the active area of the detector back to the emissive source.

The intermediate layer when machined may enable the coupling and attachment of fibres, waveguides, lights cones to be accurately aligned and connected to the detectors an intermediate layer comprising of perforated structures with pedesatals or stand-offs to enable direct integration of coupling elements such as fibres.

The intermediate layer may comprise perforated openings of varying shapes and sizes to accommodate the accurate alignment and fixturing of source or coupling elements to the detectors.

The intermediate layer maybe stiffened, for example around the periphery of the circuit to provide specific areas of rigidity where needed, examples of materials used include Cirlex with 200-300 µm thickness.

The intermediate layer may comprise adhesives sites or appropriate mounting features to align and/or lock the detectors and sources in their respective position.

The source may consist of fibres, scintillators, photonic crystal, quantum dots, lasers holy fibre, waveguides.

Coupling elements such as winston cones or adiabatic tapers, scintillating fibers or wavelength shifted fibers may be provided.

A plurality of sources may be coupled directly to multiple detectors which are addressed electrically.

A plurality of sources may be addressed electrically and coupled to a single source or plurality of sources electrically connected.

A single source may be directly coupled to multiple detectors in a hybrid assembly.

A single source may be directly coupled to multiple detectors formed on single piece of Silicon (large area monolithic chip).

A single source may be directly coupled to one or more detectors in array.

A single source may be directly coupled to single detector or summed detectors which are connected electrically.

Detectors elements may be attached electrically onto the intermediate layer via wirebonds, flip-chip assembly, lamination, printing or via a suitable replication processes.

A suitable bonding process may include bumps bonds e.g. plated, stud or via pastes, adhesives or suitable conductive materials.

A suitable bonding process may include ultrasonic or thermocompression bonds involving direct metal to metal contacts.

Multi-pin flex connector plus ribbon cable may be provided for communications to readout boards located off chip.

The intermediate layer may have custom ASIC for readout electronics directly integrated.

DETAILED DESCRIPTION

Figure 2:
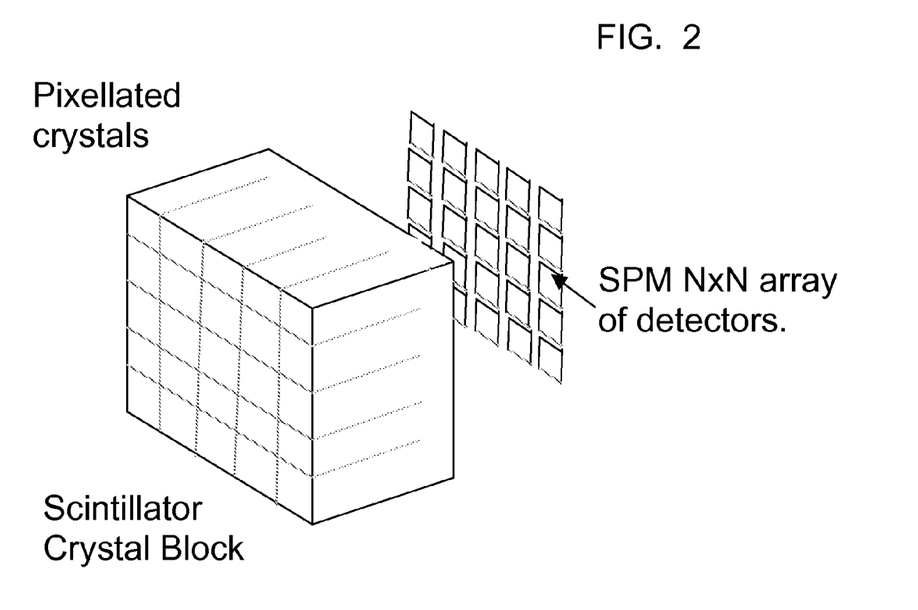
FIG. 2 shows an arrangement not embodying the present invention in which the PMT of FIG. 1 has been replaced by a SiPM detector array.

As mentioned above, it is desirable to address the integration of M×N arrays of SiPM detectors for one-to-one coupling or combined detection with scintillators for applications including but not limited to those described above. FIG. 2 is a diagram showing a simple arrangement, not embodying the present invention, in which the PMT detector implementation of FIG. 1 has been directly replaced by a SiPM detector array implementation, with direct optical coupling between the SiPM detector array and the scintillator crystal block.

Figure 3:
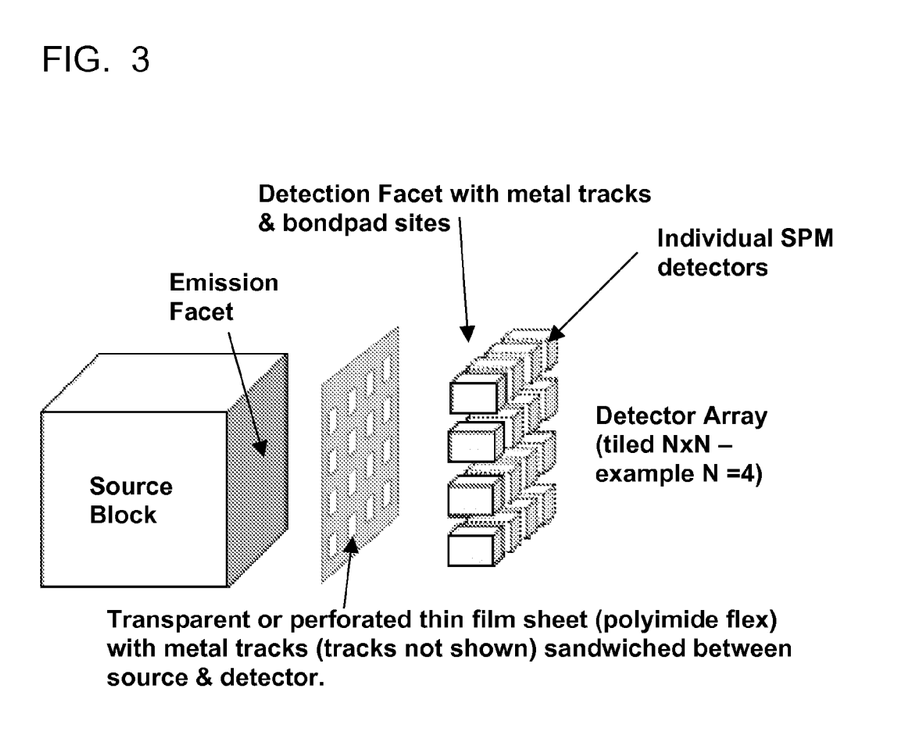
FIG. 3 is an illustrative perspective diagram showing a light sensor module embodying the present invention.

FIG. 3 is an illustrative perspective diagram showing a light sensor module embodying the present invention. The light sensor module comprises a plurality of light sensing SiPM detectors mounted and arranged on an intermediate layer between the source and the detectors. The intermediate layer in this example is a thin film flexible printed circuit board based on a polyimide based substrate.

Flex circuitry is well suited as an interconnect medium and has become widely accepted for many packaging applications which require light weight, low cost package solutions in space constrained environments.

In this application, the flex layer is static in that it is not bent into position for installation nor is it subject to numerous bends as a result of mechanical movement. The thickness of the flex is this example is 25 μm (polyimide) and 20 μm metal combination (Cu/Ni/Au).

In this example, a 5×5 array of detectors are tiled and mounted on the flex with a spacing between detectors of 100 to 200 μm. For other applications, such as microarray readers a N×1 array is required with a spacing between the detectors which is greater than 100 μm and typically 1 mm.

For this particular example where the detector pitch is small, two styles of flex construction can be used (a) single-sided flex circuits with copper conductor layers on a flexible dielectric film; or (b) double-sided flexible circuit consisting of two copper layers.

Figure 4:
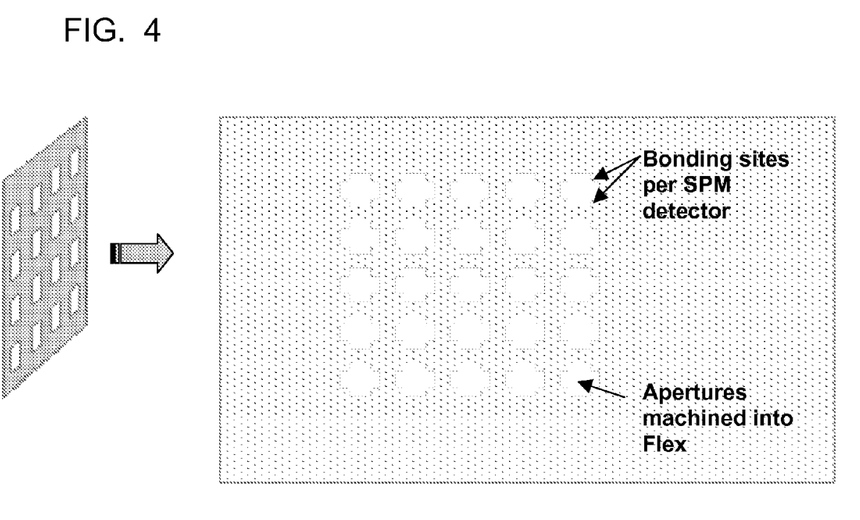
FIG. 4 illustrates an intermediate flex layer having machined apertures and SiPM bonding sites according to an embodiment of the present invention.

For high-density flex circuit technology using large array sizes N>5, multilayer flex circuits are more appropriate construction choice as the metal is buried and routed to the outside of the circuit via multiple buried interconnect layers. If optical coupling efficiency is paramount, and if the flex substrate does not provide sufficient transparency to the optical light to provide a predetermined minimum required level of optical coupling efficiency, the flex layer can be machined with a honeycomb or lattice structure by laser machining or other appropriate methods such as wet etch to allow maximum light transmission through the apertures (windows) corresponding to the active area of the detectors. This is illustrated in FIG. 4, which illustrates an intermediate flex layer having machined apertures and SiPM bonding sites (four per detector). As the region around the perforated areas is delicate a backing film similar to "blue tape" in wafer processing maybe used which provides mechanical support to the flex layers at the assembly stage. This backing film examples can be removed (peeled off) when the detector elements are assembled. The backing film adheres to the flex with a tacky adhesive. This adhesive can be removed chemically or left and used to attach the flex to the scintillator source.

The perforations or windows or apertures can be infilled with an appropriate index match material if losses are critical. Materials include silicone rubbers for making optical joints between detectors and sources such as plastic scintillators. The silicone cookies are soft and flexible and can be made to conform to contoured surfaces.

The light sensing elements can be arranged to cooperate to produce a combined output signal indicative of an overall level of light falling on the light sensing elements or several outputs signals corresponding to individually or collectively addressed detector signals.

This output signal or signals pass out of the through electrical traces (not shown in FIG. 4) and flex connectors on the intermediate layer to external circuitry for processing.

Figure 5:
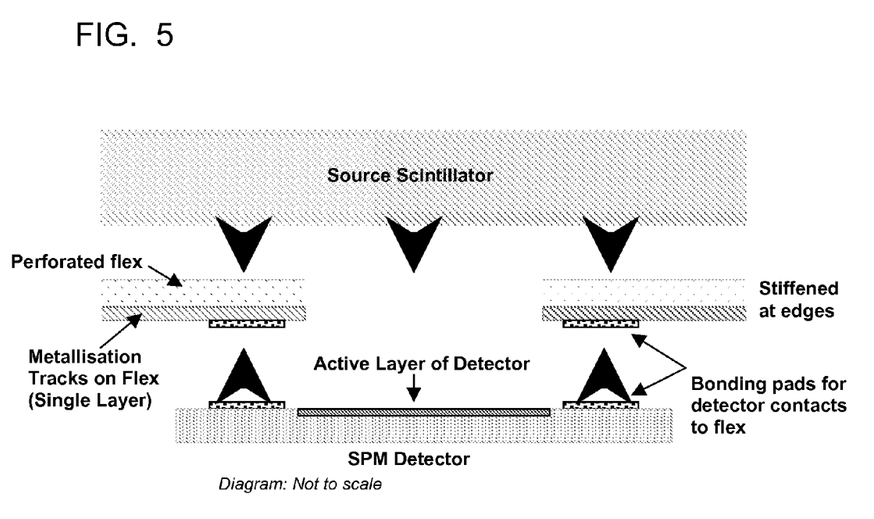
FIG. 5 is a cross-sectional view showing elements of a detector module embodying the present invention.
Figure 6:
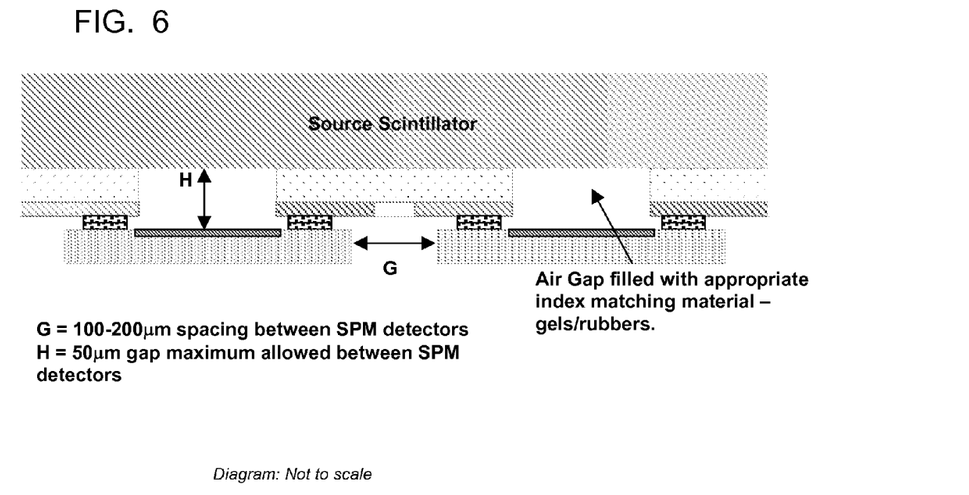
FIG. 6 shows an assembled detector module having two SiPM detectors coupled to a scintillator via an intermediate layer according to an embodiment of the present invention.

Each detector comprises a light input surface arranged to face toward the intermediate layer and source. Each detector is arranged to make electrical connection to the intermediate layer via metallised bondpads on the flex. This is illustrated in FIG. 5, which is a cross-sectional view showing different elements of the detector module construction: the scintillator, perforated flex (intermediate layer) and single SiPM detector. This enables adjacent light sensing elements to sit closely together to form a close-tiled arrangement of light sensing elements and results in a large active area; this is illustrated in FIG. 6, which shows an assembled detector module having two SiPM detectors coupled to a scintillator via an intermediate layer. Example dimensions for this assembly are indicated in FIG. 6.

The inclusion of the perforated flex printed circuit results in an air gap formation between the source and the detector. This thickness of this gap is determined by the thickness of the flex, which can be of the order of 50 μm for a single metal layer flex.

Figure 7:
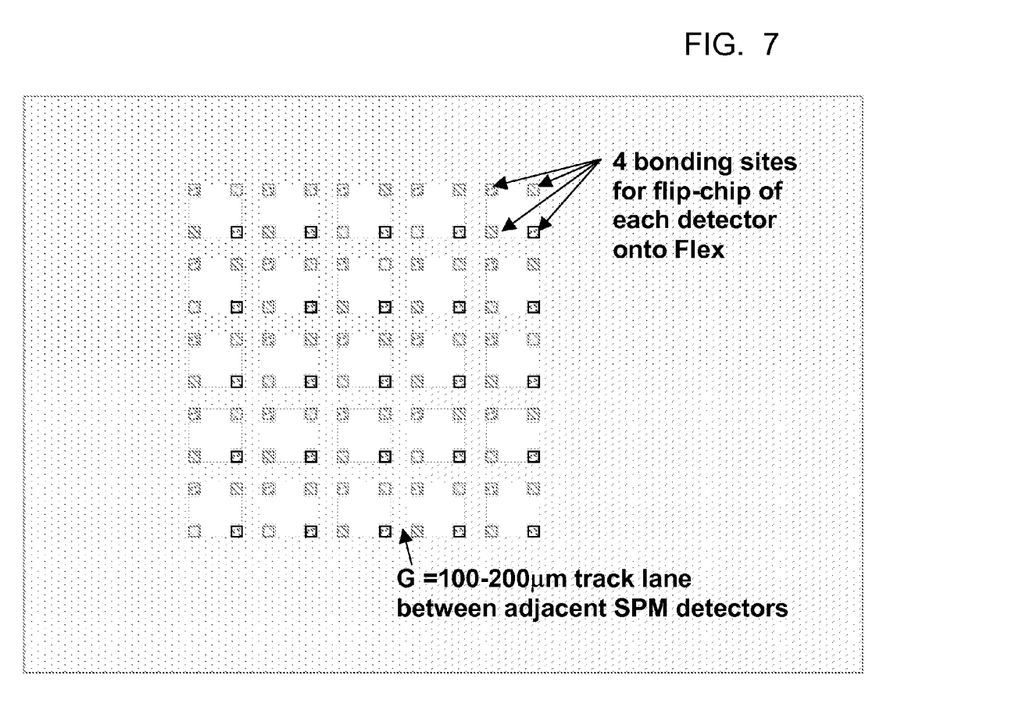
FIG. 7 illustrates an intermediate layer according to an embodiment of the present invention for use with a 5×5 array of detectors.
Figure 8:
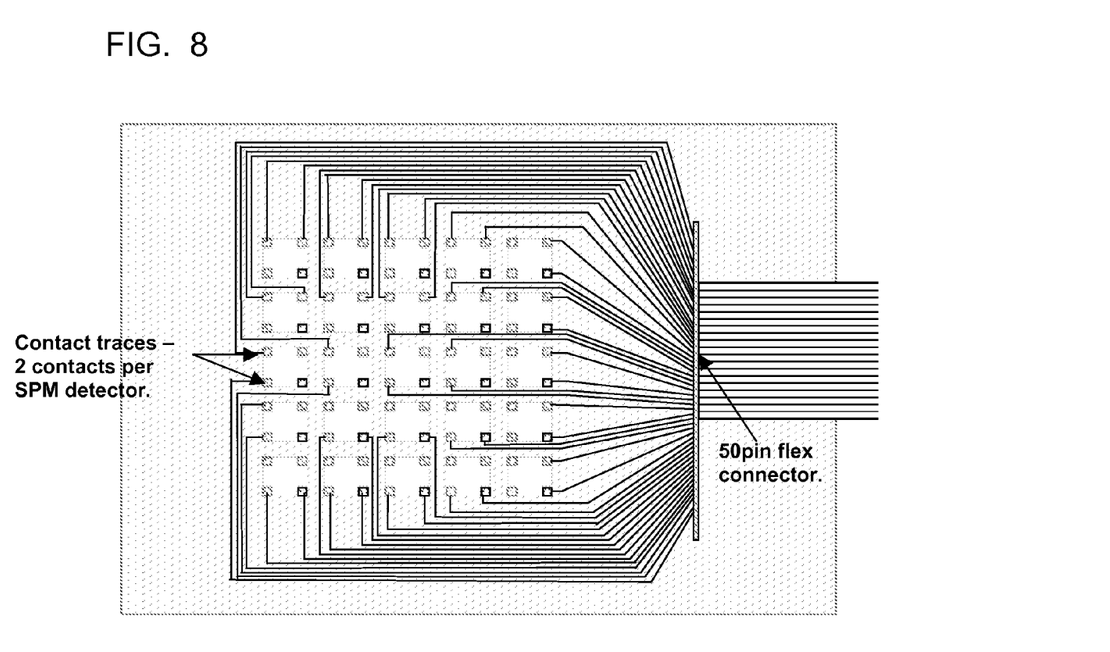
FIG. 8 shows a track layout on an intermediate layer according to an embodiment of the present invention for addressing individual detectors.

FIG. 7 illustrates an example 5×5 array of detectors, with metal layout based on single flex metal level. An example of track layout to address individually the detector outputs for one-to-one coupling to scintillator crystals for higher spatial resolution is illustrated in FIG. 8; also shown is a 50 pin flex connection for readout electronics. The detectors (not shown) are mounted in this arrangement with a ~100 to 200 μm gap between detectors. The gap is determined by the resolution of the printed circuit but typically single metal traces with track widths of the order of 30 μm are feasible.

So that the SiPM readout electronics does not degrade detector performance or resolution, a highly integrated "on-chip" front end readout electronics is provided. This is achieved through appropriate readout design, circuitry mechanics and packaging.

For readout design, several custom ASIC's prototype designs are being developed for signal preamplification and shaping. This research is at the development stage with early 18 channel ASIC prototypes available for variable gain charge preamplification and shaping (see, for example, B. Schumm, "Research and Development in Front-End Electronics for Future Linear Collider Detectors", 10th Workshop on Electronics for LHC and future Experiments, September 13-17th; Boston USA).

In the example illustrated, the readout circuitry is located "off-chip" where electronic readout boards are connected via a ribbon cable which is directly connected to the tracks on the flex via an appropriate multi-pin flex connector. Examples of such connectors include "Flip-Lock" SMT/ZIF type flexible printed circuit board connectors vertically, top contact or bottom contact type. Alternatively, SMT electronics can be mounted directly on the flex substrate but this is not an eloquent a solution compared to a customised ASIC mounted directly onto the flex.

To address the detectors individually, as shown in FIG. 8, two conductor traces are needed within the gap. There is a trade-off between with the thickness of the flex (gap height between source and detector) and the track width between the detectors.

One option is to design a single metal layer flex (typically 35 to 40 µm). Two conductor tracks between the gap will require two metal traces with three spaces, which can be challenging with the current state of the art. Alternatively, a two-layer flex could be provided that uses both sides of the flex to run traces. This allows a wider track on each side of the flex with trace widths of the order of 35 µm. This is one solution to having a ~100 µm gap. Based on state of the art, the thickness of the two-layer flex would be ~45 to 55 µm. The advantage of the second option is to minimize the gap between detectors and thus improve the overall fill factor for the detector array.

For electrical interconnection, detectors typically have either one topside contact and one backside contact or two frontside contacts. To address a detector array e.g. N=4 or N=5 requires a minimum of two conductor traces between the detectors. In the example shown, four 100×100 µm die bondpads are located at the four corners of the device. Two bondpads are used for electrical contacts while all four bondpads provide mechanical stability.

For this assembly the bondpads may be plated with sufficient metal for electrical contact. Alternatively; a gold stud bump flip chip assembly process maybe used to create conductive gold bumps on the die bond pads. Both methods connect the die to the intermediate layer with adhesive, ultrasonic or thermocompression assembly. The advantage of stud bumps is that they require no under-bump metallization (UBM), and thus does not require wafer processing such as passivation. The disadvantage of this technique is that it increases the gap height between source and detector which maybe unacceptable for certain applications.

In this example, either a 35 µm of gold stud bump or 5 µm electroplated Ni followed by an electroless gold finish is used to bump the die. The metallization of the thin film flex is typically 10 to 15 µm of copper on one or both sides finshed with a NiAu layer (1-2 µm in thickness).

One example of the bonding process involves flip-chip of the detectors directly onto bonding sites (pads) located on the flex. Several methods are envisaged to achieve this, for example:

solder bumps are deposited by plating, stud, ink-jet or appropriate techniques. The thickness of the bumps can vary depending on process as discussed above.

As described above, a novel method is set out for compact packaging optical single or multiple photodetectors to an optical source or other optical element. An array of detectors in a tiled arrangement is assembled using a small form factor thin intermediate layer between the source optical element and the detector, which allows high levels of component integration and scaling. An effective large area SiPM detector is provided and its packaging overcomes the inherent mechanical and packaging issues associated with conventional detector assembly and packaging.

The intermediate layers serves one or more of the following functions:

- as an electrical interconnection layer to address detectors (individually or collectively)
- as a mechanical interface layer between detectors and source for coupling light.
- as a substrate to mount readout electronics.
- as a mechanical interface layer to isolate different areas of source for optical response.
- as a means to improve dead space when tiling detectors.
- as a means to tile a N×M or N×N detector array together where N=1, M=1 or greater.
- as a mechanical layer which provides consistent and precise alignment of detectors with respect to the source optical element.
- as a means to sum collectively or individually detector response.
- as a means to mechanically attach the detectors to the source via an adhesive layer.

In addition, although in the main examples shown and described above the intermediate layer is substantially planar in nature even when assembled into the final sensor module arrangement, it is a highly advantageous feature of an embodiment of the present invention that the intermediate layer referred to above need not be restricted to planar sources and/or planar detector arrays. By forming the intermediate layer of a flexible material, it may be conformed and bent into various shapes and configurations while still maintaining sufficient mechanical strength and rigidity.

Figure 9:
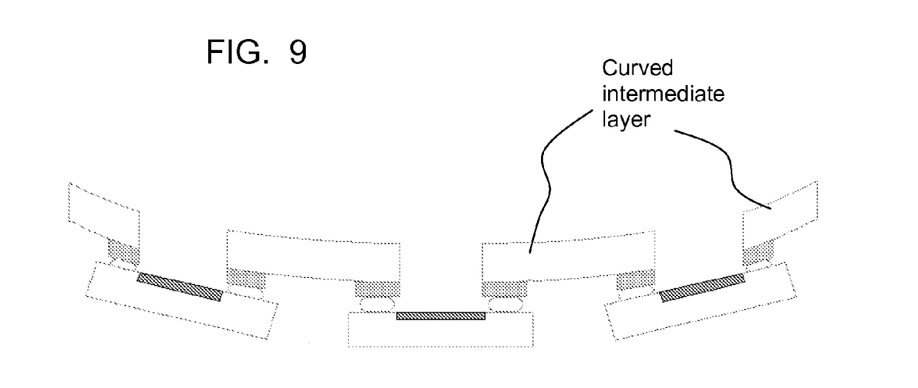
FIG. 9 illustrates an embodiment of the present invention in which an intermediate flex layer is bent to conform to the curvature of the output from a radial source.

When the intermediate layer is regarded as a flexible membrane that may be shaped, it forms a means to couple an optical source to an array of detectors mounted on a nonplanar surface, as shown for example in FIG. 9. The detectors mounted on the intermediate layer are thus able to follow the contour or profile of the source (not shown).

The intermediate layer and detector array can be curved in a manner so as to couple to the curvature of the field of view of a radial source, for example. The source can incorporate front optics such as a lens which creates a focal surface emission. A method for manufacturing flexible detectors and carrier substrates to adapt to the focal image is taught is U.S. Pat. No. 6,649,843 B2. Using this approach, the detector element is thinned and bonded to a flexible carrier substrate in order to adapt to the curvature of the field of view. This approach would typically require the use of flexible detectors with a maximum thickness of 20 µm and a length to width ratio of approximately 20-60.

For many cost-sensitive applications, it is desired to have a robust mechanical solution which does not involve chemical mechanical polishing (CMP) techniques for back thinning, isoplanar contacts which are necessary for low contact forces and complicated die handling procedures. An embodiment of the present invention provides a technique which can enable high optical sensitivity as well as using standard front side "non flexible" detector arrays and traditional bonding die techniques such as thermocompression bonds using flip-chip techniques.

Equally, an embodiment of the present invention is useful for UV-sensitive detection systems by avoiding CMP processing to remove dead, absorbing layers between the source and the active depletion region which is necessary for backside detector illumination for UV sensitivity.

A flexible intermediate layer is adaptable to the configuration of contour of the spectral, temporal and intensity profile of the radiation source. The detectors can be coupled to the radiation source by mounting the detectors on or within the flex intermediate layer.

Not only can the flex intermediate layer conform to the boundary of the radiation source, but it can also adapt and conform in a dynamic fashion to a changing boundary. The flex intermediate layer is form fitting in that the properties of the intermediate layer maybe elastic or plastic such that it can be stretched reversibly or otherwise to the construction of the previously fabricated radiation source. The flex intermediate layer thicknesses may be kept sufficiently small so to allow it to conform to the construction specifications of the radiation source. The flex intermediate layer may be arranged to conform to the housing in which the radiation source is mounted. The flex intermediate layer can be a single or multilayered arrangement of detectors. The flex intermediate layer can be wrapped around or within the contours of the housing.

The source itself may be any one or more of a point source, pixellated source on planar surface or on an arc, Lambertian, Gaussian Source, laser, LED, incandescent light bulb, microcavities (microdisks, microspheres, resonant cavity light emitting diodes, and single-photon sources). It may be a solid, liquid or gaseous material which emits light in different directions i.e. single, bi-directional, or omni directional as a result of a radiation. It may be manipulated using beam filters, expanders, concentrators, collimation of light, redirection (minors, beam splitters), diffracted (grating which give spectral profile) and refracted (aspheric lens). It may have beam preshapers; curved surface which provides radial signal over a wide acceptance angle, right angle output or any shaped out so desired.

The boundary to which the detector array is be shaped may conform to the beam output profile; intensity, temporal or spectral at or at preset locations from the radiation source. The boundary can be determined by the shape of the source housing e.g. lens. The boundary can be determined by the beam profile at a preset location from the source housing. The source boundary may be continuously changing such as an electroactive polymeric lens.

The intermediate layer can conform by wrapping to the housing, which is where the radiation is emitted. The housing design can be any desired shape, for example tubular (e.g. duct, pipe), cylindrical, oval, circular, polygonal, ring-shaped, arc housing, or square.

Applications where a curved membrane of SPM detectors would find great use include, but are not limited to:

Channel based detection systems where the detector array can be coupled to conform to the curvature of the wall of the channel. Examples include flow cytometry.

Focal surface from an optical imaging system.

Whole Body/Animal Positron Emission tomography system where the detector array lines the detector ring in single or multiple layers for time of flight PET and depth of interaction measurements.

Biomedical reader, e.g. where a detector array wraps around a clear container.

Point sensor where detectors are mounted inside a rod for invasive sensing in environments e.g. oil exploration, fluorescence in solutions.

An embodiment of the present invention allows standard frontside detector illumination, electrical contacts on the frontside side (i.e. the same surface as the active region of the detector), good optical coupling between the detector and the source optical element (e.g. scintillator), and large area detection which is scalable and which is modular in nature. The complexity of existing, known processes affect yield. An intermediate layer according to an embodiment of the present invention avoids complex assembly and mechanical stability associated with the prior art, for example as described in U.S. Pat. No. 6,117,707 and U.S. Pat. No. 7,038,287.

An embodiment of the present invention avoids at least one of the following:

elaborate post processing of the SiPM detector for electrical interconnection. Examples include via through hole etch and metallisation (plating) for through-hole vias.

complex and expensive techniques using backside illumination which requires backthinning at wafer level.

use of large and small solder bumps for flip-chip assembly.

use of wirebonds and wirebond passivation which are fragile and not mechanically robust for large detector arrays. In addition, the passivation material usually polymer coatings suffer from yellowing with age thereby degrading transmission properties of the detector system.

expensive ceramics carriers and glass lids.

A process embodying the present invention is highly adaptable to large volume manufacturing; options include: an automated pick and place process where detectors are serially flip chipped onto the intermediate layer; and an automated reel to reel process such as wirefilm bonding (see U.S. Pat. No. 6,857,459).

The invention claimed is:

1. A method of assembling a silicon photomultiplier detector module having a plurality of individual silicon photomultiplier sensing elements, optically coupled to an optical source, for receiving light therefrom, the method comprising:
a first step of coupling the plurality of silicon photomultiplier sensing elements to an intermediate layer; and
a second step, following after the first step, of coupling the intermediate layer to the optical source, such that the intermediate layer is arranged between the optical source and the silicon photomultiplier sensing elements;
wherein the intermediate layer comprises metal tracking, and is adapted to provide at least a predetermined level of optical coupling between the optical source and the silicon photomultiplier sensing elements; and
the first step comprises electrically coupling the silicon photomultiplier sensing elements to the metal tracking.

2. A method as claimed in claim 1, wherein each of the silicon photomultiplier sensing elements has a respective light input surface arranged to face the intermediate layer.

3. A method as claimed in claim 1, wherein the intermediate layer is so adapted by being thin.

4. A method as claimed in claim 1, wherein the intermediate layer has a thickness of less than 500 µm.

5. A method as claimed in claim 4, wherein the intermediate layer has a thickness of less than 100 µm.

6. A method as claimed in claim 5, wherein the intermediate layer has a thickness of less than 50 µm.

7. A method as claimed in claim 1, wherein the intermediate layer is so adapted by being sufficiently optically transparent to provide the predetermined level of optical coupling.

8. A method as claimed in claim 1, wherein the intermediate layer is so adapted by comprising a plurality of apertures formed therein, and wherein the first step comprises arranging each of the sensing elements over a corresponding respective aperture.

9. A method as claimed in claim 8, wherein sidewalls of each aperture are angled and/or metallised to improve the optical coupling.

10. A method as claimed in claim 8, comprising filling each aperture with a material having a refractive index selected to improve the optical coupling.

11. A method as claimed in claim 1, wherein the intermediate layer is provided with at least one alignment feature to enable alignment of the sensing elements on the intermediate layer.

12. A method as claimed in claim 11, wherein the intermediate layer is so adapted by comprising a plurality of apertures formed therein, and wherein the first step comprises arranging each sensing element over a corresponding respective aperture, the respective apertures defining an alignment feature corresponding to each sensing element.

13. A method as claimed in claim 12, wherein the optical source is at least partly segmented into regions, and wherein each aperture is arranged to align with a corresponding respective region of the optical source when assembled, thereby achieving alignment between the regions and the sensing elements when assembled.

14. A method as claimed in claim 1, wherein the intermediate layer comprises one or more embedded optical layers, such as waveguides and optical elements such as gratings or mirrors, to couple, transport and/or redirect light between different silicon photomultiplier sensing elements.

15. A method as claimed in claim 1, wherein the intermediate layer comprises a substantially planar film.

16. A method as claimed in claim 1, wherein the intermediate layer comprises a polymer material.

17. A method as claimed in claim 1, wherein the intermediate layer is flexible.

18. A method as claimed in claim 17, wherein the intermediate layer is partly stiffened to provide specific areas which are less flexible where needed.

19. A method as claimed in claim 18, wherein the intermediate layer is partly stiffened around a periphery of circuitry.

20. A method as claimed in claim 17, wherein the optical source comprises a curved surface, and the method comprising coupling the intermediate layer to the optical source over at least part of the curved surface, the flexibility of the intermediate layer allowing it to conform to the curved surface.

21. A method as claimed in claim 20, comprising altering the shape of the curved surface after coupling the intermediate layer to the optical source, with the intermediate layer retaining its conformance to the curved surface.

22. A method as claimed in claim 1, wherein the intermediate layer is substantially rigid.

23. A method as claimed in claim 1, wherein the intermediate layer is formed of material such as polyimide or dielectric film.

24. A method as claimed in claim 1, wherein the metal tracking is formed by one or more levels of metal, on one or both sides of the intermediate layer.

25. A method as claimed in claim 1, wherein the metal tracking forms a printed circuit on the intermediate layer.

26. A method as claimed in claim 1, wherein the metal tracking is arranged to allow each of the plurality of sensing elements to be addressed individually.

27. A method as claimed in claim 1, wherein the metal tracking is arranged to allow each of the plurality of sensing elements to be addressed collectively.

28. A method as claimed in claim 1, wherein additional circuitry and/or electrical components is/are provided on the intermediate layer.

29. A method as claimed in claim 1, wherein the intermediate layer is provided with single or multiple bondpad sites.

30. A method as claimed in claim 1, wherein the intermediate layer is provided with a patterned light reflective surface arranged to face the optical source to reflect light back towards the optical source that does not fall on a respective active area of the at least one silicon photomultiplier sensing element.

31. A method as claimed in claim 1, wherein the intermediate layer is adapted to enable the coupling and/or attachment of fibres, waveguides, light cones and the like, so as to be accurately aligned and connected to the silicon photomultiplier sensing elements.

32. A method as claimed in claim 1, wherein the intermediate layer comprises at least one perforated structure with a pedestal and/or stand-off to enable direct integration of a coupling element such as a fibre.

33. A method as claimed in claim 1, wherein the intermediate layer comprises at least one adhesive site or appropriate mounting feature to enable alignment and/or locking of the sensing elements on the intermediate layer.

34. A method as claimed in claim 1, wherein the sensing elements are arranged on the intermediate layer in a tiled or array configuration.

35. A method as claimed in claim 34, wherein each individual silicon photomultiplier sensing element comprises a die.

36. A method as claimed in claim 35, wherein a gap is provided between adjacent tiled silicon photomultiplier sensing elements.

37. A method as claimed in claim 1, wherein the optical source is selected from: fibre optics, scintillators, photonic crystals, quantum dots, lasers, holy fibres, and waveguides.

38. A method as claimed in claim 1, wherein the predetermined level of optical coupling is at least 75%.

39. A method as claimed in claim 38, wherein the predetermined level of optical coupling is at least 85%.

40. A method as claimed in claim 1, wherein the intermediate layer comprises an adhesive layer for mechanically attaching each silicon photomultiplier sensing element mounted on the intermediate layer to the further optical source.

41. A method of at least partly assembling a silicon photomultiplier detector module having a plurality of individual silicon photomultiplier sensing elements optically coupled to an optical source, for receiving light therefrom, the method comprising: coupling the silicon photomultiplier sensing elements to an intermediate layer comprising metal tracking so that the silicon photomultiplier sensing elements are electrically coupled to the metal tracking; wherein the intermediate layer is adapted to provide at least a predetermined level of optical coupling between the optical source and the silicon photomultiplier sensing elements when assembled by:
subsequently coupling the intermediate layer to the optical source so that the intermediate layer is arranged between the optical source and the plurality of silicon photomultiplier sensing elements.

42. A silicon photomultiplier detector module assembly comprising a plurality of individual silicon photomultiplier sensing elements optically coupled to an optical source, for receiving light therefrom, wherein the silicon photomultiplier sensing elements are coupled to an intermediate layer comprising metal tracking to which the silicon photomultiplier sensing elements are electrically coupled, and the intermediate layer is coupled to the optical source, such that the intermediate layer is arranged between the optical source and the silicon photomultiplier sensing elements, and wherein the intermediate layer is adapted to provide at least a predetermined level of optical coupling between the optical source and the silicon photomultiplier sensing elements.

43. A silicon photomultiplier detector module assembly as claimed in claim 42, wherein the optical source comprises a curved surface, and wherein the intermediate layer is coupled to the optical source over at least part of the curved surface, the intermediate layer being flexible so as to allow it to conform to the curved surface.

44. A silicon photomultiplier detector module assembly as claimed in claim 42, wherein each individual silicon photomultiplier sensing element comprises a die, and the silicon photomultiplier sensing elements are mounted on the intermediate layer in a tiled or array configuration.

45. A silicon photomultiplier detector module assembly as claimed in claim 44, wherein a gap is provided between adjacent silicon photomultiplier sensing elements.

46. A silicon photomultiplier detector module assembly comprising a plurality of individual silicon photomultiplier sensing elements coupled to an intermediate layer, wherein the intermediate layer comprises metal tracking to which the silicon photomultiplier sensing elements are electrically coupled, and is adapted to provide at least a predetermined level of optical coupling between the silicon photomultiplier sensing elements and an optical source when the intermediate layer is subsequently coupled to the optical source, with the intermediate layer arranged between the optical source and the silicon photomultiplier sensing elements, the silicon photomultiplier sensing elements receiving light in use from the optical source.

* * * * *